United States Patent [19]

Kovatch et al.

[11] 4,307,304
[45] Dec. 22, 1981

[54] ELECTRICAL SWITCHBOARD APPARATUS WITH CENTER FED VERTICAL RISER BUS

[75] Inventors: George N. Kovatch, Monroeville Boro.; Richard Rosey, Plum Borough, both of Pa.

[73] Assignee: Westinghouse Electric Corp., Pittsburgh, Pa.

[21] Appl. No.: 135,809

[22] Filed: Mar. 31, 1980

Related U.S. Application Data

[60] Continuation of Ser. No. 913,154, Jun. 6, 1978, abandoned, which is a division of Ser. No. 755,705, Dec. 30, 1976.

[51] Int. Cl.³ .................................................. H02B 1/04
[52] U.S. Cl. .................................... 307/147; 361/342; 361/341; 361/355; 174/71 B
[58] Field of Search ............ 307/147; 174/71 B, 72 B, 174/70 B; 361/361, 341, 342, 355

[56] References Cited

U.S. PATENT DOCUMENTS

| | | | |
|---|---|---|---|
| 3,780,355 | 12/1973 | Salvati et al. | 361/342 |
| 3,793,564 | 2/1974 | Salvati et al. | 361/342 |

FOREIGN PATENT DOCUMENTS 650830 10/1962 Canada ................................ 361/353

*Primary Examiner*—L. T. Hix
*Assistant Examiner*—James L. Dwyer
*Attorney, Agent, or Firm*—Robert E. Converse, Jr.

[57] ABSTRACT

An electrical distribution switchboard including a multiphase horizontal main bus and a multiphase vertical riser bus. A plurality of tie members are provided, one tie member being connected to each vertical phase member. Each horizontal phase conductor is connected to the tie member of its corresponding vertical phase conductor so as to symmetrically locate the top and bottom of each tie member above and below the horizontal centerline of the horizontal main bus, allowing the vertical riser bus to be fed at its electrical and geometric center.

16 Claims, 12 Drawing Figures

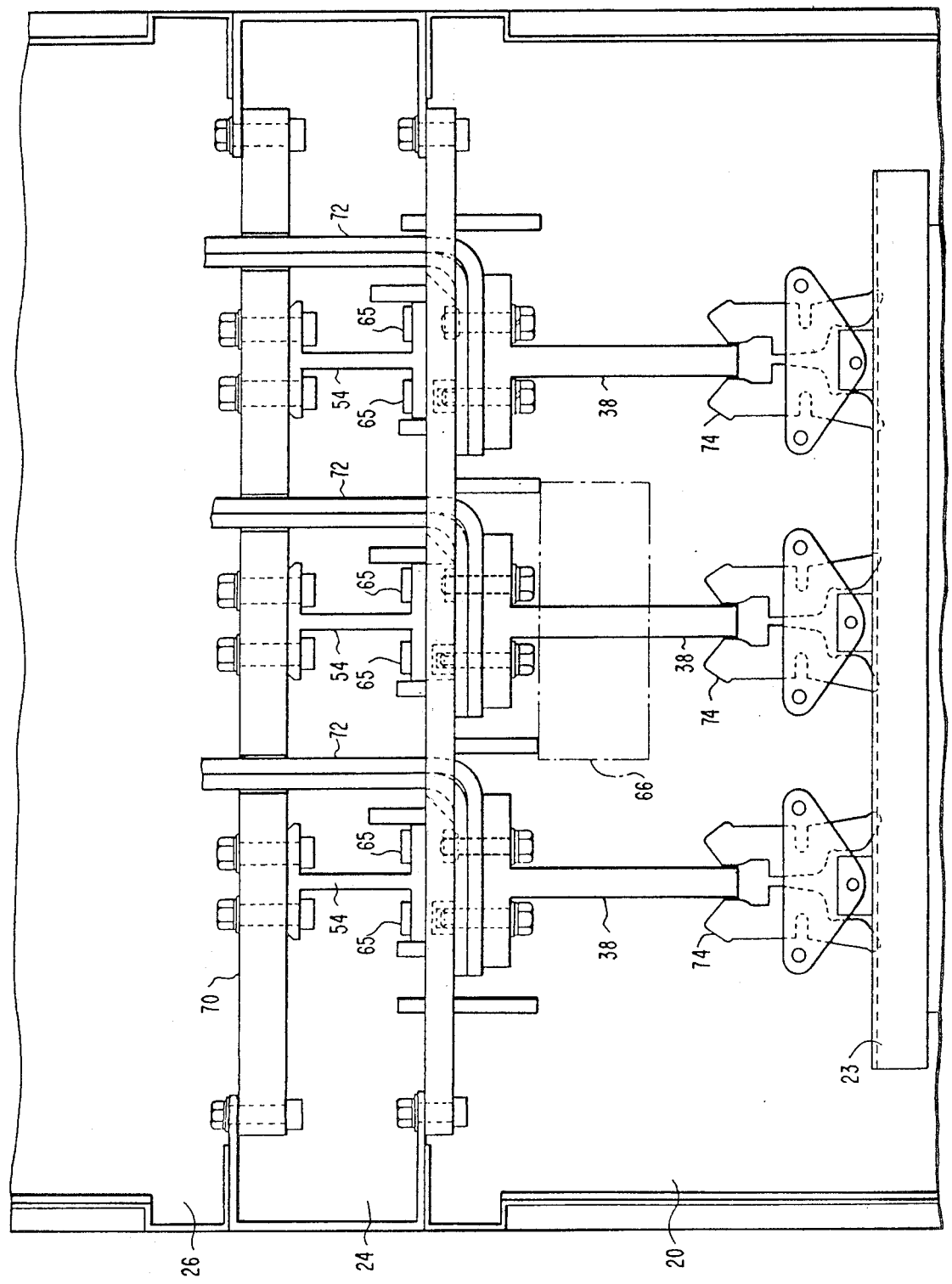

ELECTRICAL SWITCHBOARD APPARATUS WITH CENTER FED VERTICAL RISER BUS

This is a continuation of application Ser. No. 913,154, filed Jun. 6, 1978, now abandoned, which is a division of Ser. No. 755,705, filed Dec. 30, 1976.

CROSS-REFERENCE TO RELATED APPLICATIONS

The present invention is related to copending U.S. Pat. applications Ser. No. 756,035, now U.S. Pat. No. 4,099,220 entitled "Electrical Switchboard Apparatus Including Welded Bus Connector" filed Dec. 30, 1976, by G. N. Kovatch, R. Rosey, and N. H. Simon; Ser. No. 756,036, now U.S. Pat. No. 4,136,374 entitled "Electrical Switchboard Apparatus Including Double Flanged Vertical Riser Conductors" filed Dec. 30, 1976, by G. N. Kovatch, R. Rosey, N. H. Simon, and N. A. Tomasic; and Ser. No. 755,540, now U.S. Pat. No. 4,118,639 entitled "Electrical Switchboard Apparatus Including Bus System With Individual Phase Isolation" filed Dec. 30, 1976, by G. N. Kovatch, R. Rosey, and N. H. Simon. All of the above-mentioned copending U.S. patent applications are assigned to the assignee of the present invention.

BACKGROUND OF THE INVENTION

1. Field of the Invention

The invention relates to electrical switchboard apparatus and more particularly to means for connecting the main horizontal bus to the vertical riser bus forming a part of such switchboard apparatus.

2. Description of the Prior Art

An electrical distribution switchboard distributes the main incoming power among various site functions such as heating, lighting, and air conditioning. It typically consists of a number of vertical cabinet sections containing circuit breakers for switching and protecting the various load circuits. Three-phase electrical power enters a switchboard via cable or bus duct connected to a main bus which runs horizontally within the switchboard between the various sections. The main bus is connected to vertical, or riser, bus in each vertical cabinet section. Various circuit interrupters stacked vertically in the cabinet sections have their inputs connected to the vertical riser bus and their outputs connected to horizontal load side extensions which run toward the rear of the cabinet perpendicular to the main horizontal bus. Bus duct or cable is then attached to the load side extensions to permit the power to exit the switchboard and flow to the load (air conditioning, lighting, motors, etc.).

The primary requirements for a switchboard are that it be safe and dependable, and that it exhibit low cost in construction, installation, and maintenance. In addition, the switchboard should be of compact construction to reduce space requirements at the user location. The design of the switchboard should include sufficient versatility to allow circuit breakers of various interruption capacities and frame sizes to be easily included in the switchboard.

Specifically, it would be desirable to provide an electrical switchboard with the capacity to stack six 800 amp breakers in a single vertical section while providing the capability to include other frame sizes in a single section, such as four 1600 amp breakers, two 3000 amp breakers, or combinations of different frame size breakers within the same vertical section. Prior art electrical switchboards often required three different positions for the main horizontal bus, depending upon the breaker frame size mix. This required additional engineering design effort to specify the location of the horizontal bus for each individual application, as well as the need for more complex installation procedures. It would be desirable to provide a switchboard having a single location for the main horizontal bus for all breaker frame size mixes.

In producing a cost effective switchboard design, some objections are often in conflict. For example, it is possible to produce a design utilizing a minimum of material but this often dictates the necessity for a large number of different parts to accommodate the wide variety of individual switchboard applications. It would therefore be desirable to provide an electrical switchboard requiring a minimum amount of material and a minimum number of component styles, yet which is easily adaptable to accommodate a large variety of individual applications.

In order to provide such flexibility, it is desirable to have individual component parts perform more than one function. For example, several small lengths of vertical riser bus could be combined to form a variety of total riser bus lengths. By feeding the vertical riser bus at the geometric center, it would be possible to use a single part for both the upper and lower riser bus section.

In addition, it would be desirable to provide a uniform cross-section of vertical riser bus throughout its length. One method of achieving would be to feed the vertical bus in its electrical center. For example, if six 800 amp breakers are stacked in a single vertical section, the total amount of current which can be carried by these circuit breakers is 6×800=4,800 amperes. However, if the associated vertical riser bus is connected to the horizontal main bus at a point midway between the top and bottom circuit breakers, e.g. the electrical center of the vertical riser bus, the amount of current which is required to be carried by any one portion of the vertical riser bus is only one half of the total capacity of the section, since half the current will flow upward into the three upper circuit breakers and half will flow downward into the three lower circuit breakers. Therefore, the total current carrying requirement of any portion of the vertical riser bus is only 3×800=2,400 amperes. It would therefore be desirable to provide an electrical switchboard having the vertical riser bus connected to the main horizontal bus so as to feed the vertical riser bus at its geometric and electrical center.

SUMMARY OF THE INVENTION

In accordance with a preferred embodiment of the present invention, there is provided an electrical power distribution switchboard comprising a cabinet structure, and a multiphase horizontal main bus disposed within the cabinet structure and having individual horizontal phase conductors vertically spaced one above the other. The switchboard also includes a multiphase vertical riser bus disposed within the cabinet structure and having the individual vertical phase conductors horizontally spaced one beside the other. A plurality of tie members are provided, each tie member being connected to one vertical phase conductor. Each horizontal phase conductor is connected to the tie member of its associated vertical phase conductor so as to symmetrically locate the top and bottom of each tie member respectively above and below the horizontal centerline of the horizontal main bus. The tie member thus becomes an extension of the horizontal main bus in the vertical direction.

BRIEF DESCRIPTION OF THE DRAWINGS

For a better understanding of the invention, reference may be had to the preferred embodiment exemplary of the invention shown in the accompanying drawings, in which:

FIG. 6B is a sectional view similar to FIG. 6A taken along the line B—B of FIG. 5;

DESCRIPTION OF THE PREFERRED EMBODIMENT

Figure 1:
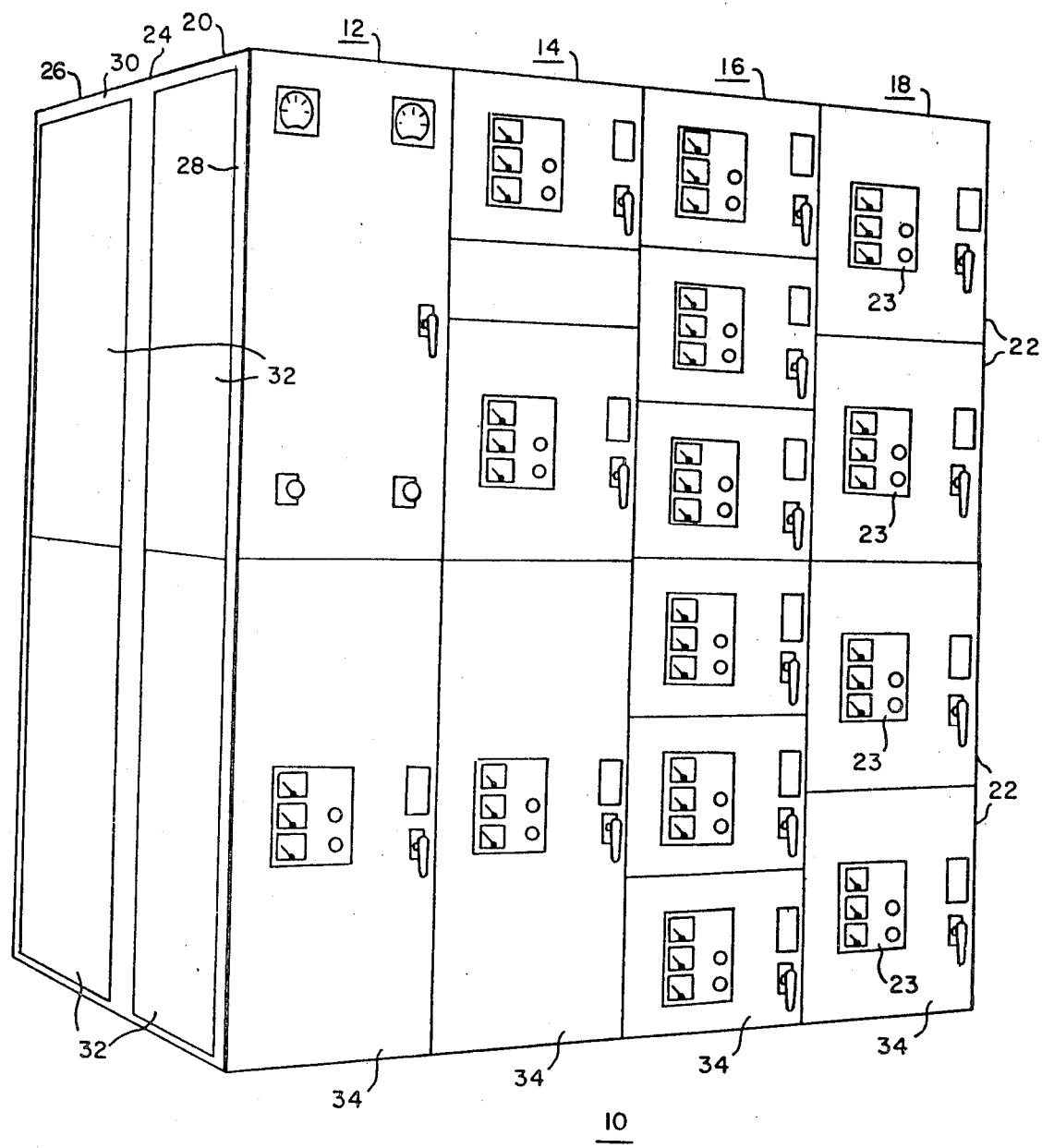
FIG. 1 is a perspective view of a four-section electrical power distribution switchboard.

Referring now to the drawings, in which like reference characters refer to like components, FIG. 1 shows an electrical distribution switchboard 10 having four vertical section structures 12, 14, 16, and 18. Each of the sections of the switchboard 10 includes a device compartment 20 separated into cells 22, a bus compartment 24, and a cable compartment 26. Each of the cells 22 contains circuit interrupters or instruments used in controlling or monitoring electrical circuits powering loads such as air conditioners, motors, and lighting.

Generally, each of the vertical sections 12, 14, 16, 18 comprise structural members such as 28 and 30 to which cover sheets 32 and doors 34 are added. Circuit breaker controls and indicators 35 are accessable through the doors 34 to operate and indicate the status of the enclosed circuit breakers.

Incoming main power is connected to a main bus which runs horizontally through the bus compartments 24 of the board 10 connecting the sections 12, 14, 16, 18. The circuit breakers in each section are then connected to the horizontal bus thrugh riser bus extending vertically in the bus compartments of each of the sections 12, 14, 16, 18.

Figure 3:
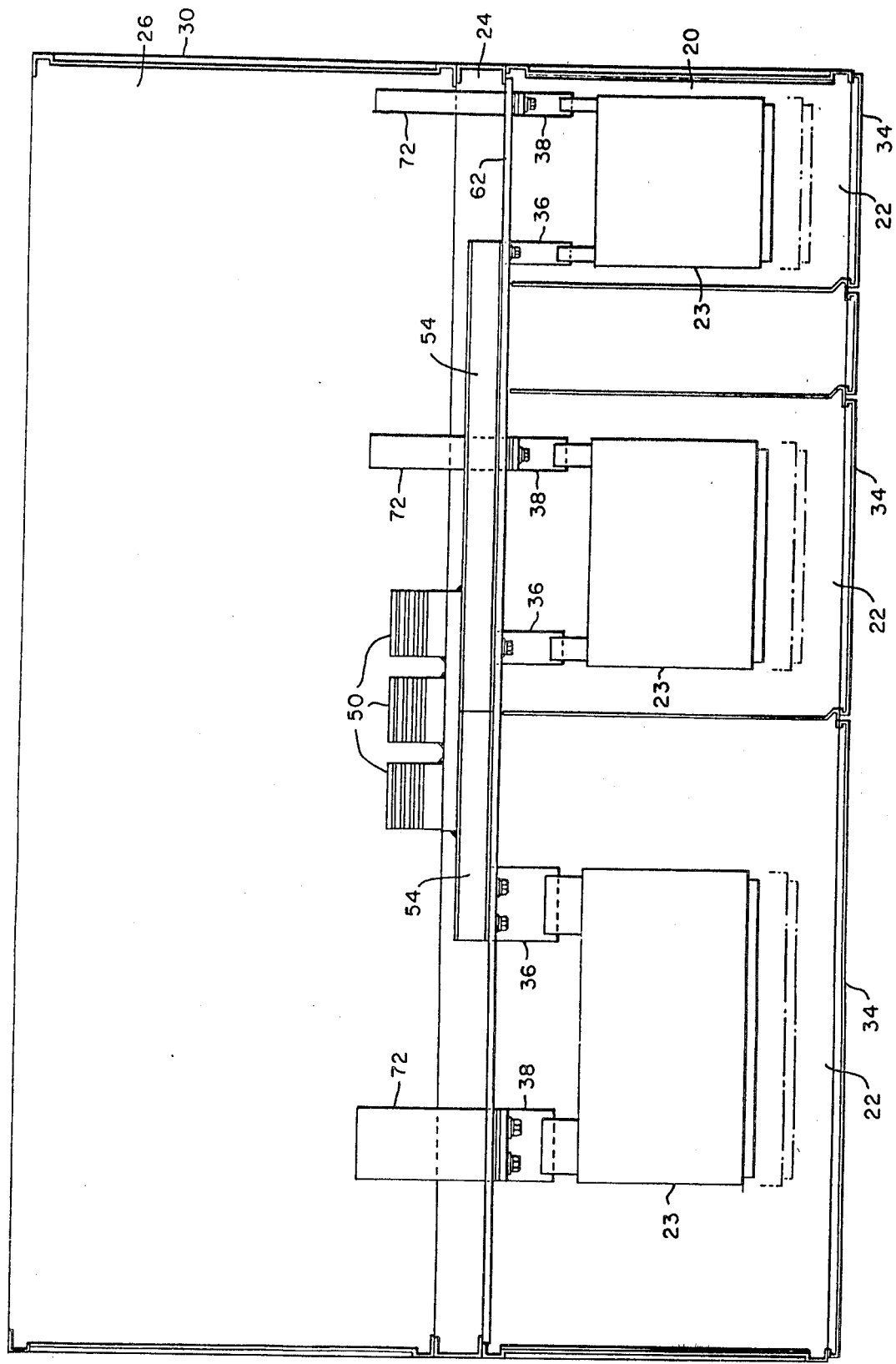
FIG. 3 is a side view of one section of the switchboard of FIG. 1.
Figure 6A:
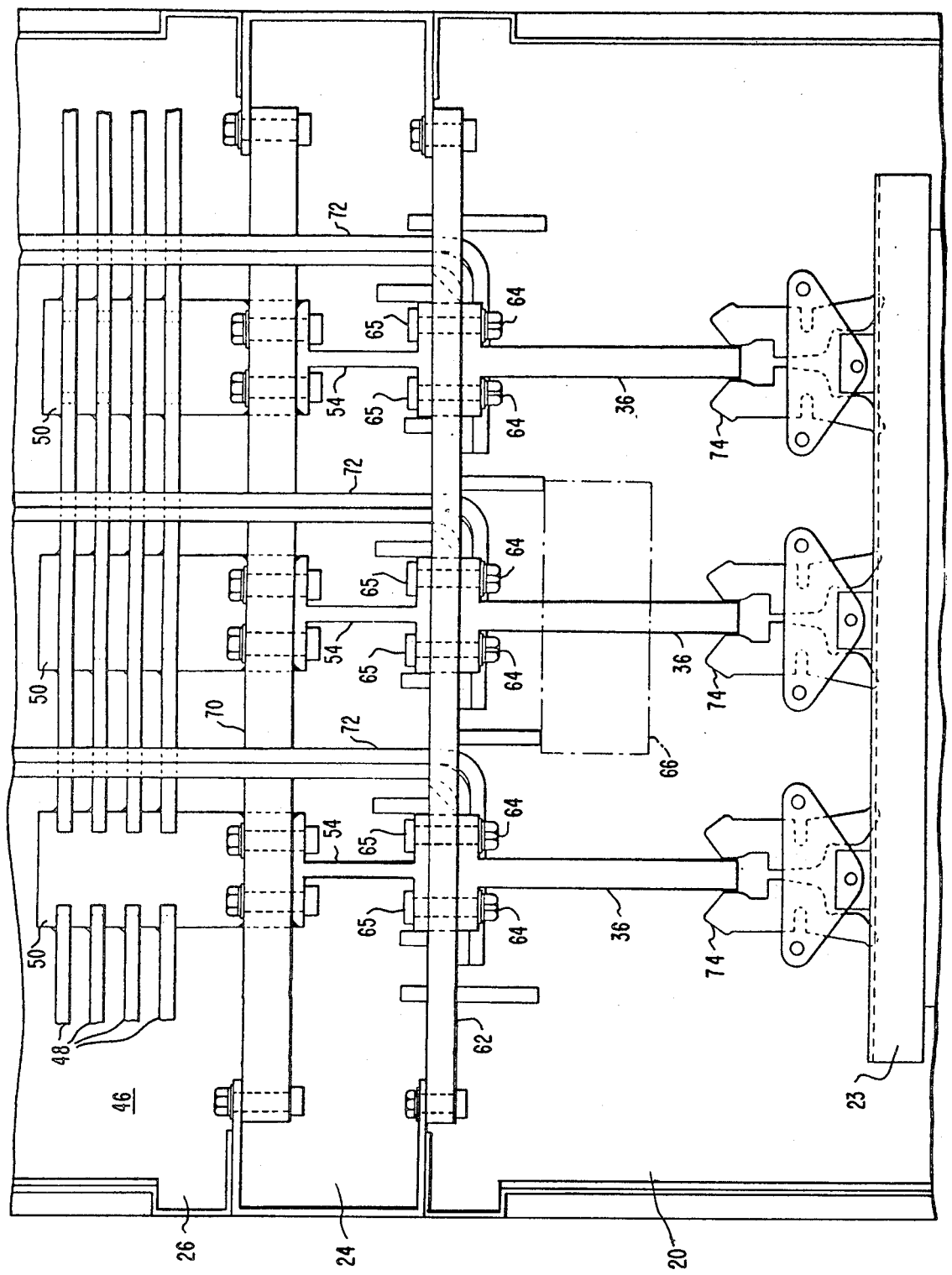
FIG. 6A is a detail sectional view of the switchboard section of FIG. 5, taken along the line A—A of FIG. 5.

As can be seen in FIGS. 3, 6A, and 6B, each of the circuit breakers 23 includes movable sliding contact connectors, or finger assemblies, 37 cooperating with line stab connectors 36 and load stab connectors 38. The interaction of the fixed stabs 36, 38 and the movable finger assemblies 37 provides sliding contact connection allowing the circuit breakers to be inserted and withdrawn from the cells 22. Other means providing such sliding contact connection could, of course, be used. The line stabs 36 which are connected to the vertical riser bus supply incoming power to the separable contacts within the circuit breaker, from which the power then flows outward through the load stabs 38 and load side runbacks 72 to the distribution circuits and loads which will ultimately be supplied.

Figure 2:
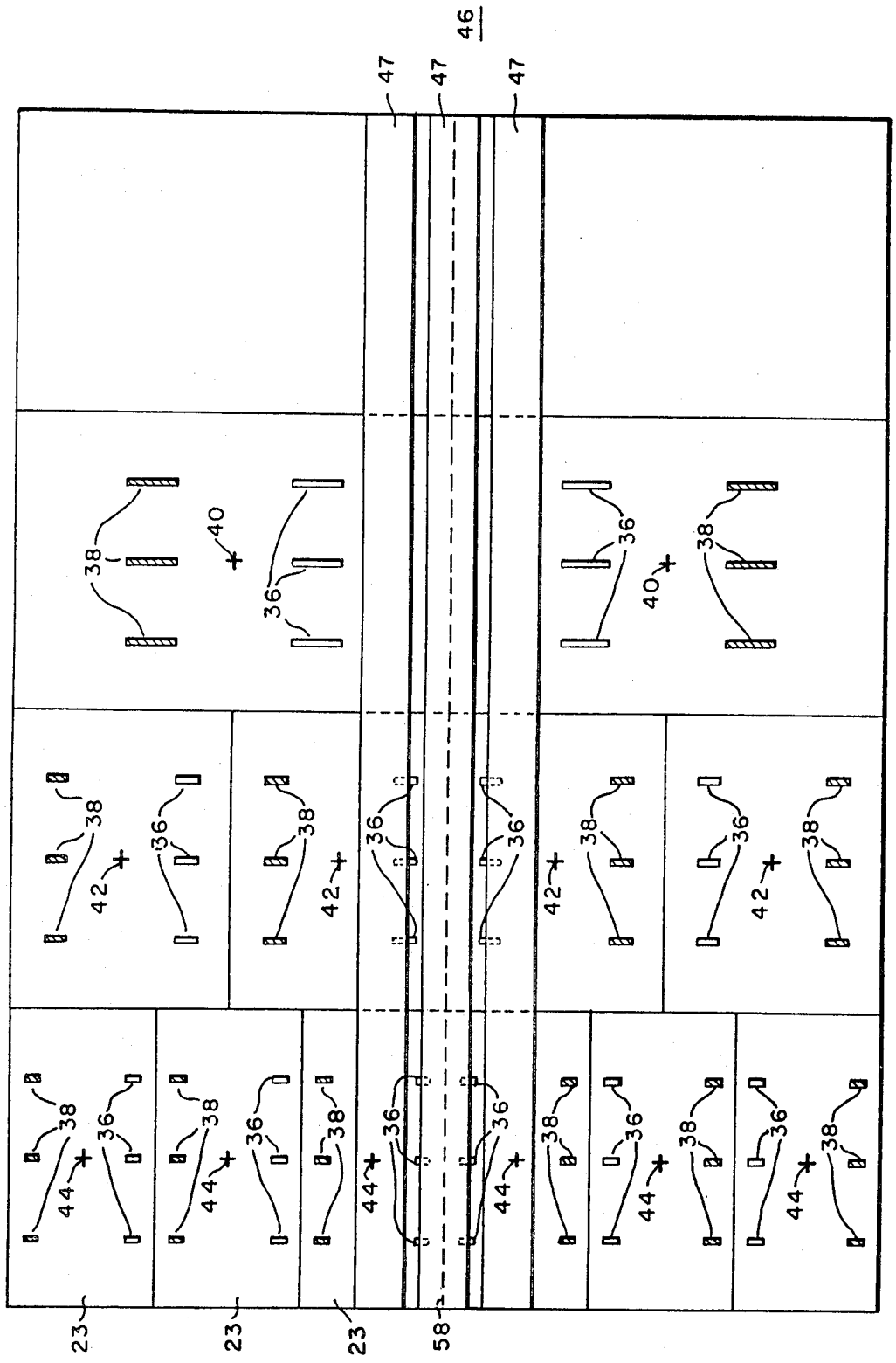
FIG. 2 is a diagrammatic view of an electrical switchboard employing the principles of the present invention, showing the locations of load and line connectors for a variety of circuit breaker frame sizes.

As can be seen in FIG. 3, a variety of circuit breaker frame sizes must be provided for. It is desirable to design the bus structure to be compatible with such a variety and mix of circuit breaker frame sizes while at the same time utilizing a minimum amount of material and simplifying, the installation of the switchboard. Prior art switchboards often provided for three different locations for the horizontal bus: at the top, the center, and the bottom of the switchboard, the location of the horizontal bus being dependent upon the location and frame size mix of the circuit breakers to be included in each individual switchboard and, specifically, the location of the load side connection. The load side runbacks extend back through the bus compartment and into the cable compartment, complicating the bus layout, since required insulation clearances must be maintained. FIG. 2 (a diagram not related to the specific circuit breaker configuration of FIG. 1) shows the locations of the line and load side stab connectors 36 and 38 for three different circuit breaker frame sizes, 3,000 ampere, 1,600 ampere, and 800 ampere, and the respective breaker horizontal centerlines 40, 42, and 44. The hatched rectangles indicate the location of load stabs 38. Above the horizontal centerline 58 of the switchboard are conventional circuit breakers which are bottom fed, that is, circuit breakers with the input line side stabs 36 at the bottom and the output load side connections 38 at the top. By employing these normal circuit breakers above the horizontal centerline of the vertical section structure and by using top, or reverse, fed circuit breakers below the horizontal bus centerline, it can be seen that an area around the horizontal centerline becomes free of load side connectors 38 and runbacks 72. This then becomes the ideal position to locate the three phase conductors of the horizontal bus 46.

Figure 4:
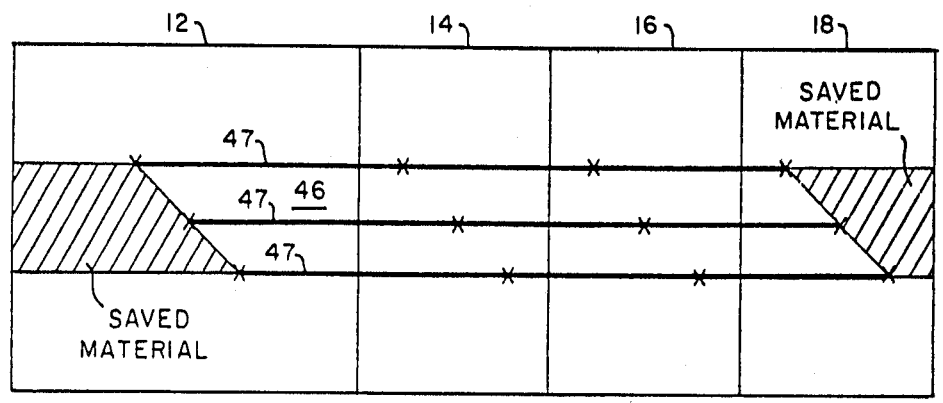
FIG. 4 is a diagrammatic view of the horizontal main bus of the four-section switchboard of FIG. 1.

It is also desirable to reduce the amount of material employed in the horizontal bus structure. FIG. 4 shows a diagrammatic rear view of the horizontal bus structure of the switchboard of FIG. 1. As can be seen, three conductor members 47 of horizontal bus 46 supply the four vertical structures 12, 14, 16, 18, with each section being connected at either end to corresponding vertical individual phase conductors of adjacent riser bus sections. Splice points are indicated by X's on FIG. 4 and occur at the point of connection between corresponding individual phase conductors of the horizontal and vertical bus. By using such connections instead of structure width conductor members spliced at structure boundaries, considerable savings in material can be realized.

Figure 7D:
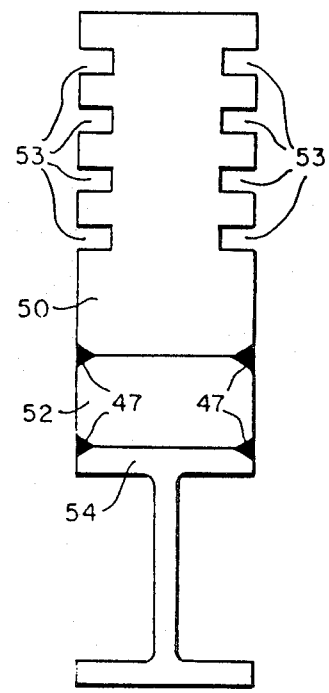
FIG. 7D is an end view of any of the vertical phase conductors shown in FIGS. 7A-7C.
Figure 5:
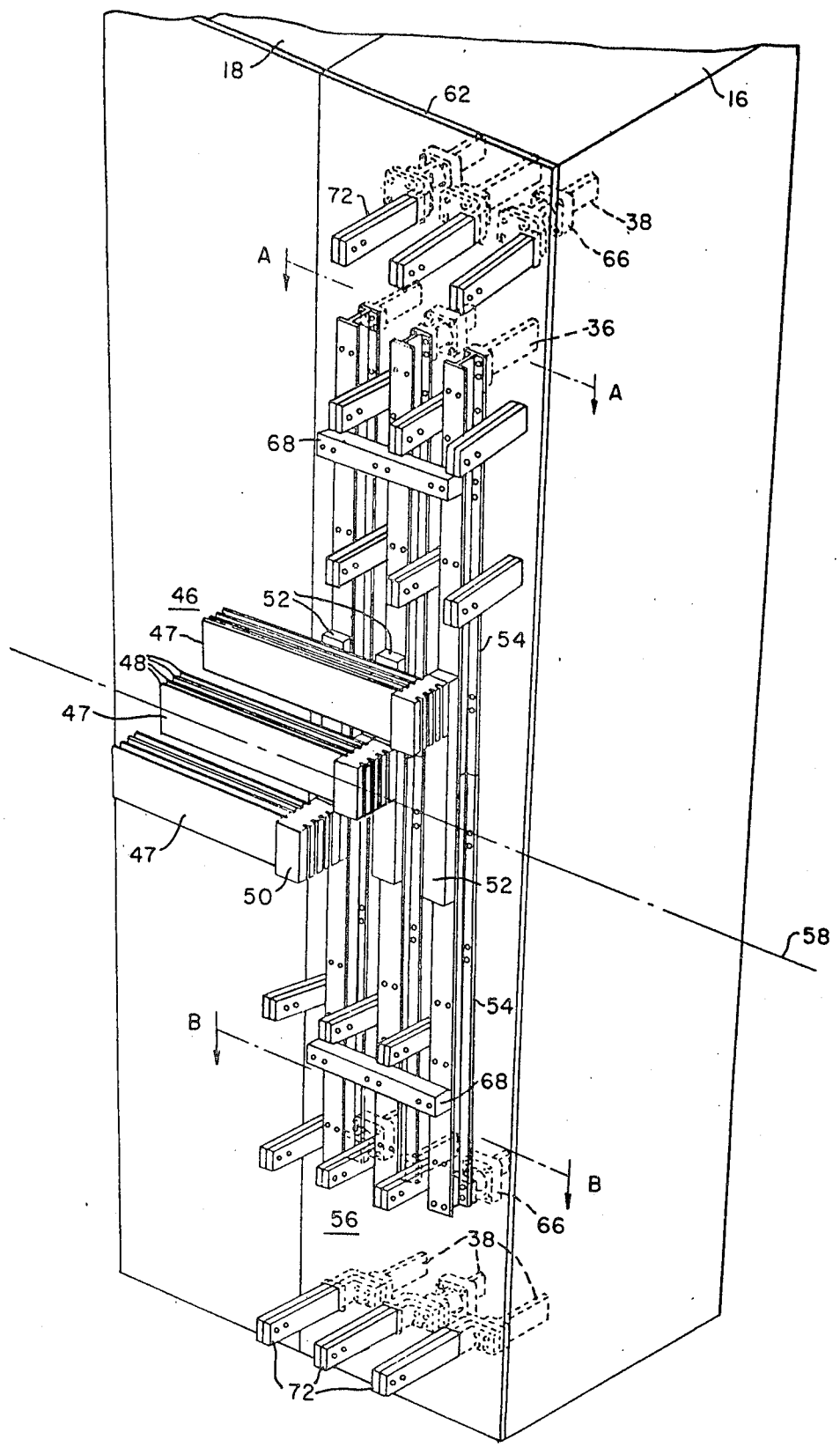
FIG. 5 is a perspective view of the junction between the horizontal main bus and the vertical riser bus of a single section of the switchboard of FIG. 1.

In order to minimize the number of different parts required for a variety of switchboard combinations, and to minimize the required cross-section of the vertical riser bus, it is desirable to supply power to the vertical riser bus at its geometric and its electrical center. This is accomplished in the present invention through the use of a tie member, or tie maker bar 52, as is shown in FIG. 5, a perspective view of the bus junction of section 16 of the switchboard of FIG. 1. Various parts have been omitted from FIG. 5 in order to more clearly indicate the method of connecting the vertical and horizontal bus. The tie maker bar 52 is a generally rectangularly sectioned aluminum extrusion having chamfered edges 47 (FIG. 7D) to facilitate welding to I-beams 54 and a connector block 50.

Figure 7A:
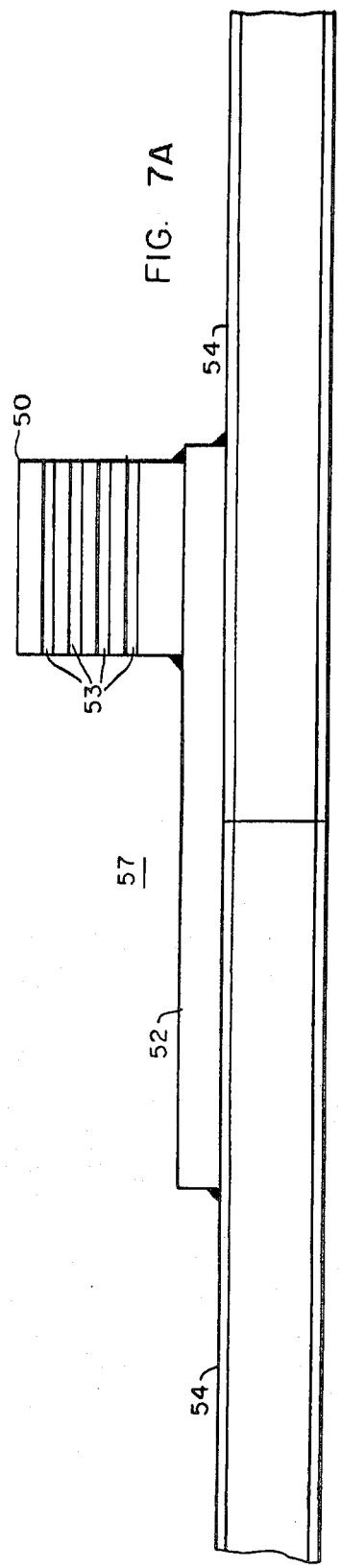
FIG. 7A is a side view of a phase A vertical phase conductor.
Figure 7B:
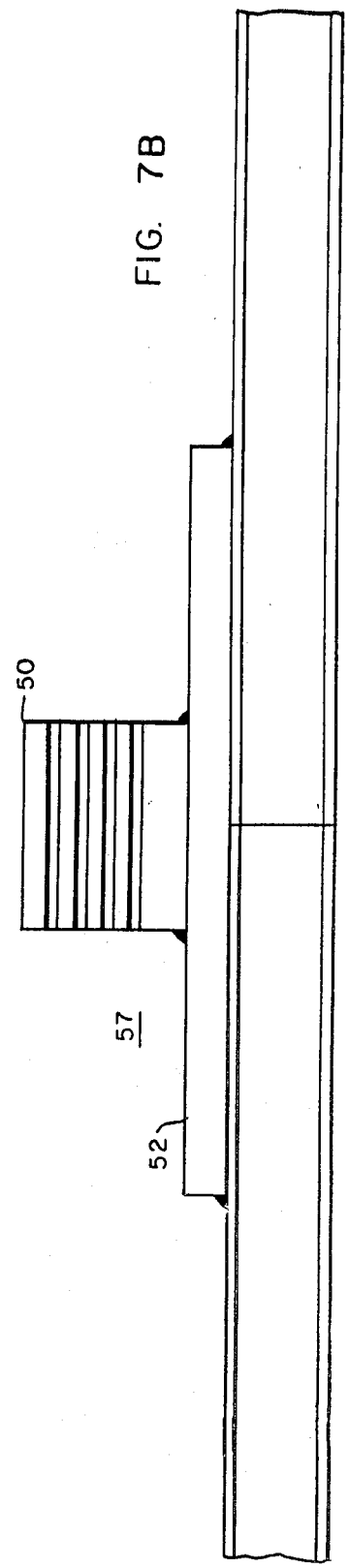
FIG. 7B is a side view of a phase B vertical phase conductor.
Figure 7C:
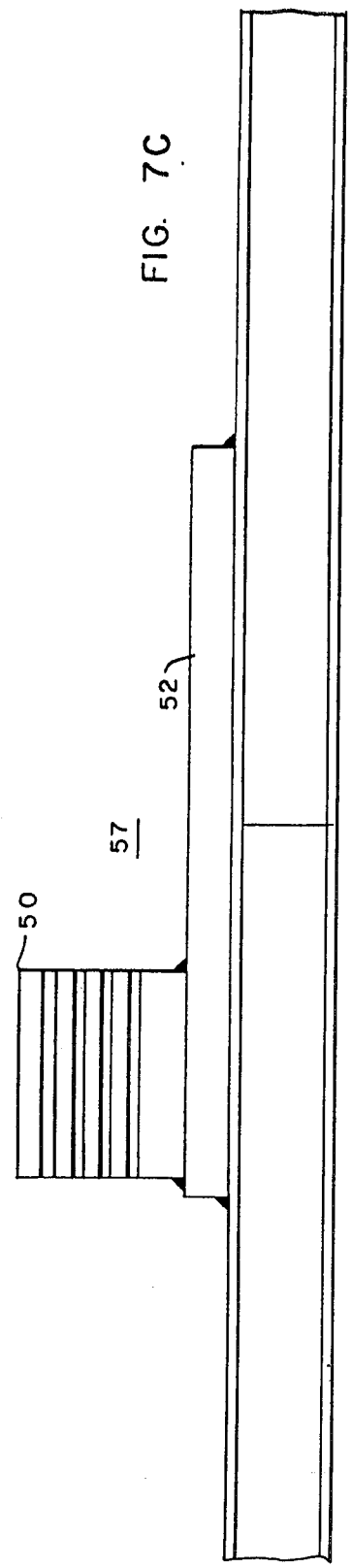
FIG. 7C is a side view of phase C vertical phase conductor.
Figure 8:
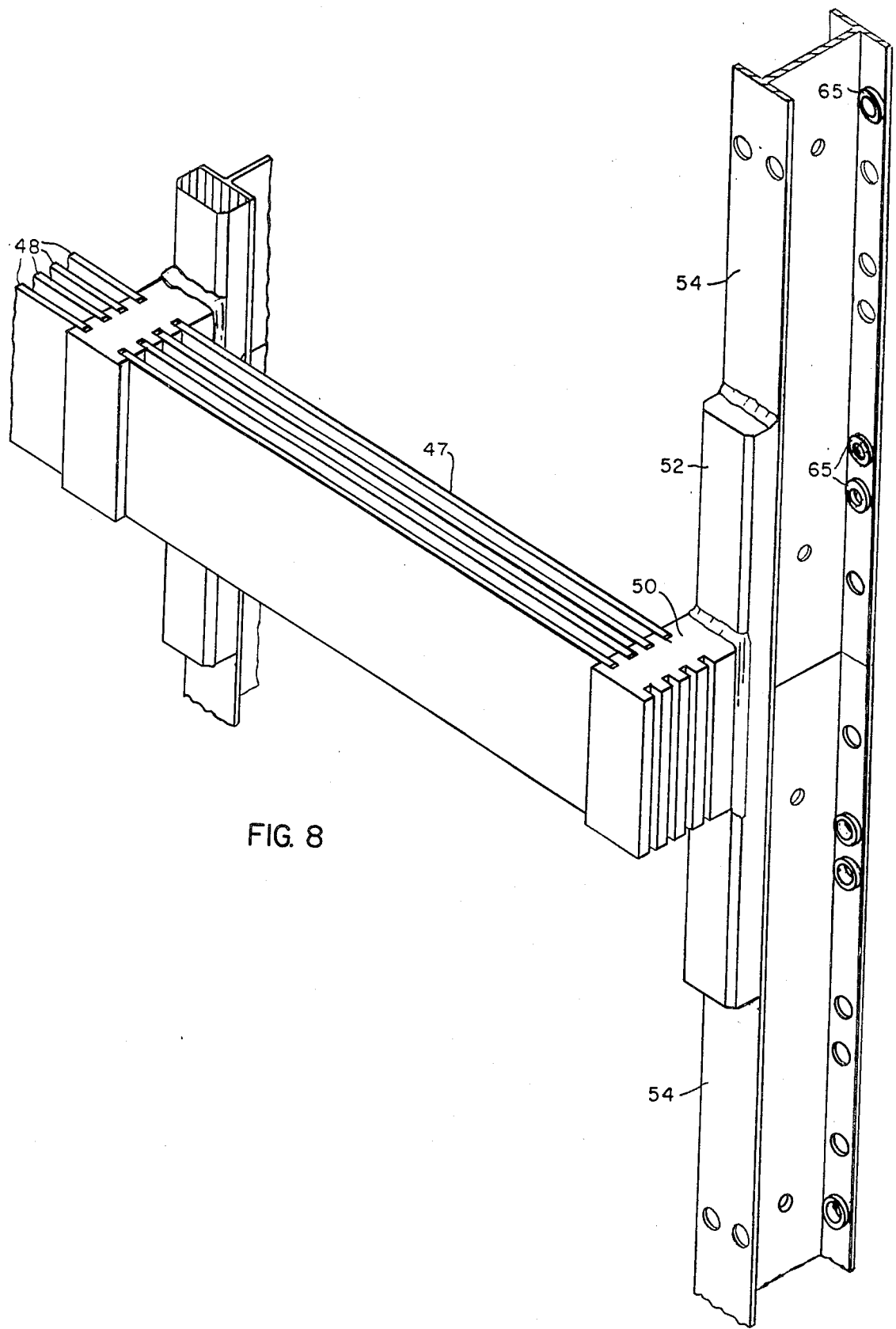
FIG. 8 is a detail perspective view of one phase of the bus junction shown in FIG. 5.

As can be seen most clearly in FIG. 8, each individual phase conductor 47 of the main horizontal bus 46 comprises four spaced parallel aluminum bars 48 welded through the connector block 50 to the tie maker bar 52 which is in turn welded to a pair of I-beams 54 to form an individual phase conductor 57 of the vertical riser bus 56. The two I-beams 54 each have front and rear flanges connected by a web portion and are symmetrically disposed on either side of the centerline 58 of the main horizontal bus 46. Similarly, each tie maker bar 52 of each phase conductor 57 of the vertical riser bus 56 is similarly disposed with its top and bottom symmetrically located above and below the horizontal main bus centerline 58 and approximately even with the upper edge of the upper horizontal phase conductor and the lower edge of the lower horizontal phase conductors, respectively. The connector 50 of phase A is seen to be welded to the top portion of its associated tie maker bar 52, while the connector 50 of phase C is welded to the lower portion of its associated tie maker bar 52. The phase B connector is welded to the center of its associated tie maker bar. This can be seen more clearly in FIGS. 7A through 7C, which are side views of the vertical phase conductors of phases A, B, and C, respectively.

The length of the tie maker bar 52 is determined by the amount of available contact area between it and the I-beams, 54 which is in turn determined by the weld bead area. In all cases, however, maximum benefits are obtained where the tie maker bar 52 is located approximately symmetrical with respect to the horizontal bus centerline 59.

As can be seen in FIG. 5, three 800 ampere circuit breakers, mounted above the centerline 58 of the horizontal main bus 46, are bottom-fed through the upper I-beams 54 of the associated vertical riser bus 56, and through tie maker bars 52 to the horizontal main bus 46. Similarly, the lower three circuit breaker connections are connected to the main horizontal bus below the centerline 58 through the bottom I-beams of the associated vertical riser bus 56 and are top-fed. The disclosed construction employing a tie maker bar 52 allows each vertical phase conductor 57 to be fed at its electrical and its geometric center. This allows a single extrusion to be used interchangeably as either the upper half of the vertical phase conductor 57 or the lower half. Similarly, no I-beam 54 is required to carry more than half of the total current which could be supplied through the associated vertical section structure. Of course, for some section configurations it is not necessary to use a full length of I-beam, such as when only a single breaker is to be mounted in the top or bottom half of a section. The two I-beams may also be welded together in certain applications.

The construction of the connector block 50 is shown most clearly in FIGS. 5, 6, 7A-7D, and 8. The connector block 50 is formed from a generally rectangularly cross-sectioned aluminum extrusion with a plurality of locating means such as the rectangularly sectioned channels, or grooves, 53 formed laterally along the largest side surface of the connector block 50. The top and bottom I-beams 54, the tie maker bar 52, and the connector 50 are assembled at a bench location to form each vertical phase conductor 57 of the vertical riser bus 56. Each of the three vertical phase conductors 57 for each vertical section structure is mounted (in the manner to be hereinafter described) to a glass polyester insulating barrier 62 disposed between the device compartment 20 and the bus compartment 24. The horizontal bars 48 are then welded to the connector 50 in the grooves 53 beginning with the groove closest to the tie maker bar 52. The remaining bars 48 are then welded one by one between the connecting blocks 50 of the corresponding phases of adjacent vertical structures. The connector block 50 allows the horizontal bars 48 to be easily located in the proper position during assembly, thereby maintaining the desired spacing between bars. This spacing is provided to reduce the amount of material necessary for a given current carrying capacity of the main horizontal bus, since it has been found that a plurality of parallel spaced conductors is more efficient than a single conductor of the same cross-sectional area. No jig fixture is required to hold all bars in position prior to welding since the bars are positioned one at a time rather than requiring two or more bars to be welded together. In certain cases where maximum current carrying capacity is not required, one or more grooves can be left blank, thereby increasing the spacing between the remaining bars. Tapering of the main horizontal bus is also easily accomplished with the grooved connector 50 by bringing the desired number of bars into the connector 50 on one side and attaching a fewer number of bars on the opposite side, downstream from the power source.

The main horizontal bus 46 is entirely supported by the vertical riser bus 56. Thus, the main horizontal bus can be composed of conducting members equal in length to the spacing between like phases of adjacent vertical riser bus, with mechanical and electrical connections being made only at the ends of the members. This saves considerable material over the section width bus system, as is shown in FIG. 4.

It is not necessary for the connector blocks 50 to have a rectangular cross-section. For example, the sides could converge in steps, with the widest step at the point where the connector block 50 is welded to the tie maker bar 52 and the narrowest step at the top of the block farthest from the tie maker bar 52, thereby forming a "Christmas tree" cross-section. While the benefits obtainable through the use of the tie maker bar are not limited to bus systems employing the grooved connector 50, it has been found that increased versatility and reduced assembly cost result from the use of the connector block 50 as shown and disclosed herein.

Similarly, it is not necessary to employ the tie maker bar construction in order to obtain the benefits provided by the grooved connector block 50. However, the tie maker bar provides a simple and effective means for feeding the vertical riser bus at its geometric and electrical center. These same tie maker bar benefits are also obtained when used in bolted systems.

The insulating glass polyester barrier 62 separates the device compartment 20 and the bus compartment 24. The I-beams 54 of the vertical riser bus 56 are mounted to the glass polyester barrier by bolts 64 passing through the barrier 62 from the device compartment side thereof. The bolts 64 are threaded into fluted press nuts 65 inserted from the rear into holes in the front flange of the I-beams 54. As the bolts 64 are tightened, the I-beams 54 are secured to the polyester barrier 62.

The line stab connectors 36 for the circuit breakers 23 are similarly fastened to the front flange of the I-beams 54 with bolts and press nuts 65, while the load stab connectors are bolted to the barrier 62 using threaded inserts 67 (FIG. 6B). The connectors 36 and 38 extend through holes in the glass polyester barrier 62 into the device compartment 20. Metering current transformers 66 are mounted upon the connectors 36 and 38 from the device compartment side of the polyester barrier 62. Since the press nuts are fixed into the flange of the I-beams 54, and the threaded inserts 67 are fixed in the polyester barrier 62, access to the press nuts and threaded inserts is not required when inserting or removing the bolts. Thus, the connectors 36 and 38 can be removed or replaced from the device compartment 20 of the switchboard, eliminating the need to deenergize the switchboard and gain access to the bus compartment 24. Since the current transformers 66 are mounted upon the connectors 36 and 38 on the device compartment side of the polyester barrier 62, they can be similarly replaced without requiring access to the bus compartment. This is an important maintenance and safety feature since it is not required to remove any of the cover sheets 32 to replace current transformers or line connectors, nor is it necessary to subject the users of the switchboard to a service interruption for deenergization, as was sometimes required in prior art switchboards.

The rear flange of the I-beams 54 secures riser support members 68, providing needed structural strength to resist forces produced under transient overload current situations. Similarly, members 70 are provided to support the load side runbacks 72 which extend rearwardly into the cable compartment 26 for connection to outgoing cables or bus duct. The members 70 are bolted to the riser bus and bus compartment structure, as seen in FIGS. 6A and 6B, and include notches, or cutouts, through which the load side runback extends. These notches provide lateral rigidity and prevent side-to-side movement of the load side runbacks 72 caused by electromagnetic forces under severe overcurrent conditions.

It can be seen therefore, that the I-shaped cross-section of the vertical riser bus 56 provides an efficient means for mechanical support of the vertical riser bus 56 and associated members while providing a high electrical current carrying capacity in a compact configuration.

What is claimed is:

1. Electrical power distribution bus apparatus comprising:
    a main supply bus connected to a source of electrical power comprising a plurality of main supply bus phase conductors disposed in a common plane;
    a distribution bus connected to an electrical load, said distribution bus comprising a like number of distribution bus phase conductors substantially perpendicular to said main supply bus phase conductors and parallel to the plane defined by said main supply bus phase conductors; and
    a plurality of elongated electrically conductive tie members each connected between one of said main supply bus phase conductors and a corresponding distribution bus phase conductor, each of said elongated tie members being symmetrically positioned with respect to the longitudinal centerline of said main supply bus and extending parallel to its corresponding distribution bus phase conductor and being in electrical contact with said distribution bus phase conductor at points along the length of said elongated tie member.

2. Apparatus as recited in claim 1 wherein each of said elongated tie members includes a plurality of surfaces parallel to its longitudinal axis, one of said surfaces being electrically joined to said corresponding main supply bus phase conductor and another of said surfaces being electrically joined to said corresponding distribution bus phase conductor.

3. Apparatus as recited in claim 2 wherein each of said distribution bus phase conductors extends in opposite directions away from its corresponding main supply bus phase conductor.

4. Apparatus as recited in claim 3 wherein each of said distribution bus conductors comprises first and second separate portions each extending in opposite directions from said corresponding main supply bus phase conductor.

5. Apparatus as recited in claim 4 wherein said first and second distribution bus conductor portions are electrically joined to their corresponding tie member at points symmetrically located on opposite sides of the longitudinal centerline of said main supply bus.

6. Apparatus as recited in claim 2 wherein said joined tie member surfaces are substantially parallel.

7. Apparatus as recited in claim 6 wherein each of said tie members has a substantially rectangular cross section.

8. Apparatus as recited in claim 7 wherein each of said tie members has chamfered longitudinal edges.

9. Electrical power distribution bus apparatus comprising:
    a main supply bus connected to a source of electrical power comprising a plurality of main supply bus phase conductors disposed in a common plane;
    a distribution bus connected to an electrical load, said distribution bus comprising a like number of distribution bus phase conductors substantially perpendicular to said main supply bus phase conductors and parallel to the plane defined by said main supply bus phase conductors; and
    a plurality of elongated electrically conductive tie members each connected between one of said main supply bus phase conductors and a corresponding distribution bus phase conductor, each of said elongated tie members being symmetrically positioned with respect to the longitudinal centerline of said main supply bus and extending parallel along its entire length to its corresponding distribution bus phase conductor and being in electrical contact with said distribution bus phase conductor at points along the length of said elongated tie member.

10. Apparatus as recited in claim 9 wherein each of said elongated tie members includes a plurality of surfaces parallel to its longitudinal axis, one of said surfaces being electrically joined to said corresponding main supply bus phase conductor and another of said surfaces being electrically joined to said corresponding distribution bus phase conductor.

11. Apparatus as recited in claim 9 wherein each of said distribution bus phase conductors extends in opposite directions away from its corresponding main supply bus phase conductor.

12. Apparatus as recited in claim 9 wherein each of said distribution bus conductors comprises first and second separate portions each extending in opposite directions from said corresponding main supply bus phase conductor.

13. Apparatus as recited in claim 9 wherein said first and second distribution bus conductor portions are electrically joined to their corresponding tie member at points symmetrically located on opposite sides of the longitudinal centerline of said main supply bus.

14. Apparatus as recited in claim 9 wherein said joined tie member surfaces are substantially parallel.

15. Apparatus as recited in claim 9 wherein each of said tie members has a substantially rectangular cross section.

16. Apparatus as recited in claim 9 wherein each of said tie members has chamfered longitudinal edges.

* * * * *